April 7, 1964 J. E. G. YOUNG 3,127,745
HYDROSTATIC TRANSMISSION
Filed July 5, 1962
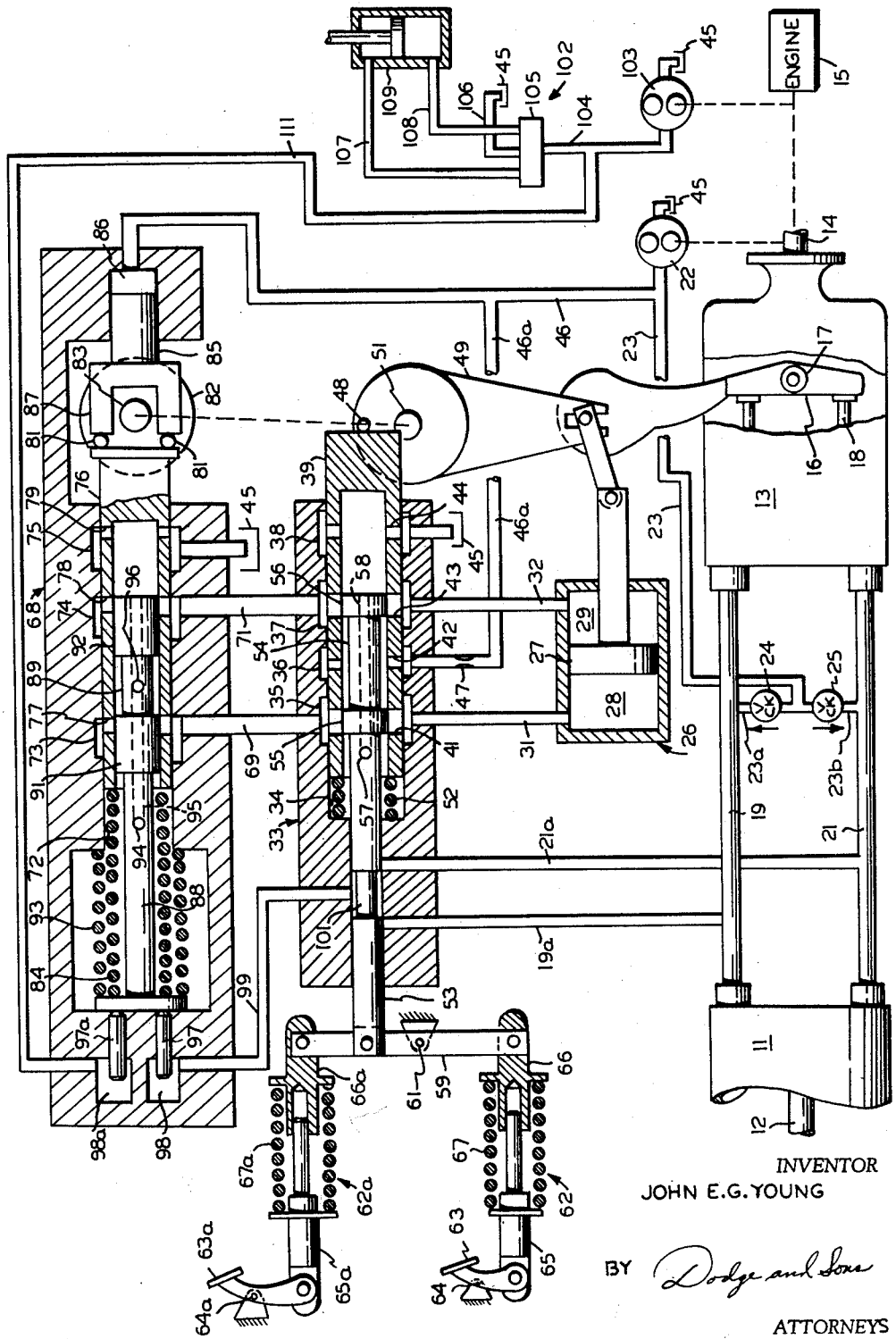
INVENTOR
JOHN E.G. YOUNG
BY *Dodge and Sons*
ATTORNEYS United States Patent Office 3,127,745
Patented Apr. 7, 1964

3,127,745
HYDROSTATIC TRANSMISSION
John E. G. Young, Watertown, N.Y., assignor to The New York Air Brake Company, a corporation of New Jersey
Filed July 5, 1962, Ser. No. 207,555
8 Claims. (Cl. 60—53)

This invention relates to hydrostatic transmissions and particularly to improved controls for limiting the power transmitted by such transmissions.

A hydrostatic transmission, as known in the prior art, comprises a closed circuit including a pump and a motor, the motor being driven by the pump and serving itself to drive the load to be operated upon. In a typical case, the pump is of the variable displacement type and manual control means are provided for varying its displacement, and consequently the speed of operation of the motor. When the transmission is used to drive the wheels of a vehicle, such as a front end loader, it is possible for the operator to select a speed of operation which, under the prevailing load conditions, causes the transmission to impose an excessive power demand on the vehicle engine which is driving the transmission pump. Because of this, it usually is necessary to provide an override device that automatically limits the power demanded by the transmission in order to preclude unintentional stalling of the engine.

The object of this invention is to provide an improved override device of the type just mentioned. According to this invention, the displacement control element of the transmission pump is positioned by a position-responsive servo control that includes a fluid pressure motor. The control is operated manually and serves to selectively pressurize and vent the fluid pressure motor in order to move the displacement control element in the displacement-increasing and displacement-decreasing directions, respectively. Associated with the fluid pressure motor is an override device which responds to the load pressure in the high pressure side of the transmission circuit and serves to open and close a vent connection leading from the motor when the pressure rises above and falls below a predetermined value. The invention also provides control means that functions to vary this predetermined value in inverse relation to the displacement of the transmission pump so that the product of transmission speed (i.e., pump displacement) and load (i.e., pressure) is maintained substantially constant.

The preferred embodiment of the invention is described herein with reference to the accompanying drawing whose single figure is a schematic diagram of an improved transmission according to this invention suitable for use on a front end loader.

As shown in the drawing, the transmission includes a reversible, fixed displacement motor 11 whose drive shaft 12 is connected with the wheels of the loader (not shown) and a variable displacement overcenter pump 13 whose drive shaft 14 is connected with the engine 15. Both the motor 11 and the pump 13 are of the rotary cylinder barrel longitudinally reciprocating piston type and the pump 13 includes a cam plate 16 that is angularly shiftable between maximum stroke positions on opposite sides of the illustrated neutral or zero stroke position. The axis of the trunnions 17 of the cam plate 16 is so positioned that the reaction forces exerted by pump pistons 18 urge the cam plate toward the neutral position. Pump 13 and motor 11 are connected in a transmission circuit by main conduits 19 and 21 and this circuit is maintained liquid-filled by a charge pump 22 with which it is connected by conduit 23 and branch conduits 23a and 23b containing reversely set check valves 24 and 25. In its complete form, this transmission, like most others, includes high and low pressure relief valves for limiting the pressures in the high and low pressure sides of the circuit and for permitting a portion of the fluid in the circuit to be withdrawn and cooled. A suitable relief circuit is shown in U.S. Patent 2,961,829, granted November 29, 1960.

Cam plate 16 is positioned by a servo control including a double-acting motor 26 having a piston 27 which is connected with the cam plate 16 and opposed working chambers 28 and 29. Hydraulic oil is supplied to and exhausted from working chambers 28 and 29 through conduits 31 and 32, respectively, under the control of servo valve 33. This valve comprises a housing formed with a bore 34 encircled by four longitudinally-spaced annular chambers 35–38 and containing a reciprocable valve sleeve 39 formed with four longitudinally-spaced sets of radial passages 41–44 that register with chambers 35–38, respectively. Chambers 35 and 37 are connected with conduits 31 and 32, respectively, chamber 38 is connected with reservoir 45, and chamber 36 is connected with charge pump 22 through conduit 46 and a branch conduit 46a containing a metering orifice 47. At its right end, valve sleeve 39 engages cam pin 48 carried by a follow-up arm 49 that is pivoted at 51 and is connected by a pin and clevis joint with cam plate 16 and motor 26. A light coil spring 52 biases valve sleeve 39 to the right into contact with cam pin 48.

Communication between radial passages 41–44 is controlled by a reciprocable valve plunger 53 mounted in sleeve 39 and formed with an annular groove 54 that separates two valve lands 55 and 56. In the illustrated neutral position of valve 33, which also is a null position, lands 55 and 56 isolate passages 41 and 43, respectively, from each other and from the other radial passages and also isolate passage 42 from passage 44. Therefore, in this position, double-acting motor 26 is hydraulically locked and charge pump 22 is loaded. When valve plunger 53 is shifted to the right from the neutral position relatively to valve sleeve 39, annular groove 54 interconnects radial passages 42 and 43, and radial passages 41 and 44 are interconnected by the radial passage 57 and axial bore 58 formed in the plunger. Shifting of valve plunger 53 to the left from the neutral position relatively to valve sleeve 39 causes groove 54 to interconnect radial passages 41 and 42 and allows passages 43 and 44 to communicate with each other through the interior of the valve sleeve 39. In this description, it is assumed that leftward movement of valve plunger 53 from the neutral position causes pump 13 to discharge to main conduit 29 and the transmission to operate in the forward direction, and that rightward movement of the plunger causes pump 13 to discharge to main conduit 21 and the transmission to operate in the reverse direction.

At its left end, valve plunger 53 of the servo valve 33 is connected with a lever 59 which is pivoted at 61 and whose opposite ends are connected to the forward and reverse actuators 62, and 62a, respectively. Actuator 62 comprises a foot pedal 63 that is pivoted at 64 and to which is pivotally connected a piston 65 which is guided in a cylinder 66 that is pivotally connected to lever 59. A coil spring 67 acts as a force-transmitting link between piston 65 and cylinder 66. Actuator 62a is identical to actuator 62 so its parts carry the same reference numerals with the subscript a added for clarity.

Fluid may also be exhausted from the opposed working chambers 28 and 29 of double-acting motor 26 under the control of a vent valve 68 with which these working chambers are connected by conduit 31, annular chamber 35, and conduit 69, and conduit 32, annular chamber 37, and conduit 71, respectively. This vent valve 68 includes a housing formed with a longitudinal bore 72 that is encircled by three longitudinally spaced annular chambers 73–75 and which contains a reciprocable valve sleeve 76 formed with three sets of longitudinally spaced radial passages 77–79 that register with the chambers 73–75, respectively. Annular chambers 73 and 74 are in continuous communication with conduits 69 and 71, respectively, and annular chamber 75 is in continuous communication with reservoir 45. At its right end, valve sleeve 76 engages a pair of cam pins 81 carried by a follow-up disc 82 pivoted at 83 and connected to rotate with follow-up arm 49. The valve sleeve 76 is biased to the right into engagement with cam pins 81 by a light coil spring 84. A biasing motor comprising piston 85 and working chamber 86 reacts on the follow-up linkage through a fork 87 and serves to urge the cam plate 16, motor 26 and valve sleeves 39 and 76 to their illustrated neutral positions. Working chamber 86 of the biasing motor continuously receives fluid under pressure from charge pump 22 through conduit 46.

Slidable in valve sleeve 76 is a valve plunger 88 formed with an annular groove 89 and lands 91 and 92. Plunger 88 is biased to the left to the illustrated position by a graduating spring 93, and in this position lands 91 and 92, respectively, block radial passages 77 and 78. When plunger 88 moves to the right relatively to valve sleeve 76, a point is reached at which the lands uncover passages 77 and 78 and these passages are connected with reservoir 45 through radial passage 94, axial bore 95, radial passages 79 and chamber 75, and through radial passage 96, axial bore 95, radial passages 79 and chamber 75, respectively. Rightward movement of valve plunger 88 is effected by an override motor comprising piston 97 and working chamber 98. Working chamber 98 is selectively connected with whichever of the main conduits 19 and 21 is the high pressure conduit through conduit 99 and either branch conduit 19a or branch conduit 21a by an annular groove 101 formed in the valve plunger 53 of the servo valve 33. When valve plunger 53 is shifted to the left to cause pump 13 to discharge to main conduit 19, groove 101 interconnects conduits 99 and 19a and that portion of the plunger between groove 101 and land 55 blocks conduit 21a. On the other hand, when valve plunger 53 is shifted to the right to cause pump 13 to discharge to main conduit 21, groove 101 interconnects conduits 99 and 21a and that portion of the plunger to the left of groove 101 blocks conduit 19a.

In the usual case, the loader includes a hydraulic circuit for actuating the material-handling bucket, and in the preferred embodiment, such a circuit is indicated at 102. The implement circuit 102 comprises a fixed displacement pump 103 driven by engine 15 and arranged to deliver fluid under pressure to a conduit 104 leading to the inlet port of a four-way open center directional control valve 105. Directional control valve 105 is provided with an exhaust conduit 106 and a pair of motor conduits 107 and 108 which are connected with the opposite sides of a double-acting piston motor 109. Although only one motor 109 is illustrated, it will be understood that in most cases a plurality of such motors is used. The load pressure in conduit 104 is transmitted via conduit 111 to a second override motor in vent valve 63 comprising piston 97a and working chamber 98a. Thus, in the preferred embodiment, the vent valve is operated in accordance with the combined loads in the implement and transmission circuits. This feature of the illustrated embodiment is disclosed and claimed in the copending application of Charles O. Weisenbach and Samuel G. Williams, Serial No. 306,218, filed September 3, 1963.

*Operation*

When the forward and reverse pedals 62 and 62a are in their neutral positions, valve plunger 53 of the servo valve assumes the illustrated neutral position in which lands 55 and 56 overlie radial passages 41 and 43, respectively. Therefore, at this time, motor 26 is hydraulically locked and holds cam plate 16 in the zero displacement position.

If it is desired to drive the vehicle in the forward direction, the operator depresses foot pedal 63 to cause lever 59 to move in the counterclockwise direction about pivot 61 and shift valve plunger 53 to the left to a position in which plunger groove 54 interconnects radial passages 41 and 42. Fluid delivered by charge pump 22 now passes to working chamber 28 through a supply path comprising conduits 46 and 46a, annular chamber 36, radial passages 42, plunger groove 54, radial passages 41, annular chamber 35 and conduit 31. Since working chamber 29 is now vented to reservoir 45 along a path comprising conduit 32, annular chamber 37, radial passages 43 and 44 and annular chamber 38, motor 26 moves cam plate 16 in the clockwise direction about the axis of trunnions 17 and causes pump 13 to discharge to main conduit 19. Because of the presence of the follow-up linkage, cam pin 48 shifts valve sleeve 39 to the left against the bias of spring 52 as the cam plate 16 moves away from the zero displacement position. When the sleeve 39 has been moved to a null position with respect to valve plunger 53, i.e., to a position in which lands 55 and 56 block passages 41 and 43, respectively, the supply path to motor 26 will be interrupted and the motor will come to rest. At this time, motor 26 is again hydraulically locked.

The servo control is of the position responsive type, and, therefore, it always tends to move cam plate 16 to, and maintain it in, a position that corresponds to the current position of pedal 63.

It will be observed that as valve plunger 53 moves to the left from the illustrated neutral position, plunger groove 101 interconnects conduits 19a and 99. Therefore, when the transmission is operating in the forward direction and main conduit 19 is the high pressure conduit, the load pressure in the transmission circuit is transmitted to working chamber 98 of the override motor 97, 98. If this load pressure increases (for example, as the result of the vehicle encountering an incline), piston 97 shifts valve plunger 88 to the right against the bias of graduating spring 93 toward a vent position in which land 91 uncovers radial passages 77 and land 92 uncovers radial passages 78. The location of this vent position along the path of travel of plunger 88 depends upon the longitudinal position of valve sleeve 76 in bore 72 which, in turn, depends upon the position of cam plate 16. As the cam plate 16 moves away from the neutral position in the forward direction, follow-up disc 82 is rotated in the counterclockwise direction about pivot 83 and the upper cam pin 81 shifts valve sleeve 76 to the left against the bias of spring 84. Therefore, the position of sleeve 76, and consequently, the positions of radial passages 77 and 78 along the path of travel of lands 91 and 92, always correspond to the position of the cam plate 16.

When the load pressure in the transmission circuit approaches a value which, at the prevailing displacement of pump 13, would cause engine 15 to stall, valve plunger 88 is moved to the vent position mentioned above and working chamber 28 is vented to reservoir 45 along a first vent path that includes conduit 31, annular chamber 35, conduit 69, annular chamber 73, radial passages 77 and 94, axial bore 95, radial passages 79 and annular chamber 75. The reaction forces of pump pistons 18 in combination with the biasing force developed by motor 85, 86 now move cam plate 16 toward the neutral position from the displacement position established by foot pedal 63. Since working chamber 29 is vented to reservoir 45 through a second vent path comprising conduit 32, annular chamber 37, conduit 71, annular chamber 74, radial passages 78 and 96, axial bore 95, radial passages 79 and annular chamber 75, cavitation in this side of motor 26 is prevented during this movement of cam plate 16. The reduction in the displacement of pump 13 reduces the speed of the transmission and, consequently, the horsepower demand on engine 15. As the cam plate 16 moves toward neutral position and follow-up disc 82 rotates in the clockwise direction, spring 84 causes valve sleeve 76 to move to the right. When the displacement of the pump 13 has been reduced to a safe value for the prevailing load pressure, radial passages 77 and 78 will again be closed by lands 91 and 92, respectively, and the vent paths from working chambers 28 and 29 will be interrupted. If the load pressure continues to increase, cam plate 16 will ultimately be moved to the neutral position.

Movement of cam plate 16 to a reduced displacement position as a result of the override action of motor 97, 98 permits spring 52 to shift valve sleeve 39 to the right relatively to valve plunger 53 and thereby cause plunger groove 54 to again interconnect radial passages 41 and 42 and open the supply path from charge pump 22 to working chamber 28. The flow restrictor 47 in this path limits the supply rate to a value less than the rate of exhaust through vent valve 68 and, therefore, as long as vent valve 68 is open, the pressure in working chamber 28 is insufficient to enable the motor 26 to hold cam plate 16 in the position established by foot pedal 63 against the biasing forces that are urging it toward neutral position. Thus, the supply action of the servo valve 33 does not nullify the overriding action of vent valve 68. Once the displacement of pump 13 has been reduced to the maximum value permitted at the prevailing load pressure in the transmission circuit and vent valve 68 closes, working chamber 28 will be pressurized (since the supply path is still open) and motor 26 will tend to move cam plate 16 back toward the displacement position called for by foot pedal 63. However, as soon as the cam plate 16 begins to move in the displacement-increasing direction, the upper cam pin 81 shifts valve sleeve 76 of the vent valve to a vent position with respect to valve plunger 88 and working chamber 28 is again vented. Therefore, the override control effectively prevents the cam plate 16 from moving to a position establishing a greater displacement than that dictated by the prevailing load pressure.

When the load pressure decreases, graduating spring 93 will move valve plunger 88 back toward the illustrated neutral position and the servo control will immediately move cam plate 16 toward the displacement position corresponding to the current position of foot pedal 63. If the horsepower demanded by the transmission at this time is not excessive, cam plate 16 will be moved to and hydraulically locked in the position selected by the operator.

From the preceding discussion, it will be apparent that override motor 97, 98 serves to vary the displacement of pump 13 in inverse relation to system pressure and that the pressure at which this motor becomes effective increases and decreases, respectively, as the displacement of the pump decreases and increases. With this type of control, the horsepower required to drive the transmission at any throttle setting of engine 15 is substantially constant. The parts of the control are so designed and proportioned that this constant horsepower demand is safely below the stalling load for the engine 15.

Since the loader includes an implement circuit 102 which also imposes a load on engine 15, the illustrated embodiment includes a second override motor 97a, 98a which, like the first override motor 97, 98, serves to reduce the power demanded by the hydrostatic transmission. The inclusion of this second motor does not change the mode of operation of the controls, but simply varies the transmission load pressure at which override occurs in accordance with the load pressure in the implement circuit. Thus, when the implement circuit is idle (i.e., when directional control valve 105 is in neutral position and pump 103 is unloaded), working chamber 98a is pressurized only slightly and, for all practical purposes, motor 97a, 98a does not influence the operation of vent valve 68. On the other hand, when directional control valve 105 is shifted to an operative position in which pump 103 is disconnected from exhaust conduit 106 and connected with either conduit 107 or 108, the pressure in the implement circuit rises and override motor 97a, 98a does develop a significant shifting force. Under this condition, the valve plunger 88 will be shifted to the vent position by the combined efforts of the two override motors and the maximum pressure established in the transmission circuit for any setting of cam plate 16 will be less than when the implement circuit is idle, i.e., unloaded.

In order to stop the vehicle, the operator releases foot pedal 63 and allows springs 67 and 67a to shift valve plunger 53 to the right to the illustrated neutral position. This movement of the valve plunger causes plunger groove 54 to interconnect radial passages 42 and 43, and thus open a supply path from charge pump 22 to working chamber 29, and establishes an exhaust path from working chamber 28 to reservoir 45 comprising conduit 31, annular chamber 35, radial passages 41 and 57, axial bore 58, radial passages 44, and annular chamber 38. Motor 26 now moves cam plate 16 toward the zero displacement position. When valve plunger 53 reaches the illustrated neutral position, cam plate 16 will have reached its neutral position, spring 52 will have returned valve sleeve 39 to a null position with respect to the valve plunger, and spring 84 will have returned valve sleeve 76 to its neutral position.

In order to drive the loader in the reverse direction, the operator depresses foot pedal 63a so that valve plunger 53 is shifted to the right from the illustrated neutral position. This movement of the valve plunger opens a supply path from charge pump 22 to working chamber 29 that includes radial passages 42, plunger groove 54 and radial passages 43, and opens an exhaust path from working chamber 28 to reservoir 45 that includes radial passages 41 and 57, axial bore 58 and radial passages 44. Motor 26 now moves cam plate 16 in the counterclockwise direction about the axis of trunnions 17 to a displacement position corresponding to the position of foot pedal 63a. As the cam plate 16 moves away from its neutral position, cam pin 48 moves to the right and allows spring 52 to shift valve sleeve 39 toward a null position with respect to plunger 53. Simultaneously, the lower cam pin 81 moves valve sleeve 76 to the left. When the cam plate 16 reaches the selected position, the valve sleeve 39 will have reached a null position and consequently, motor 26 will be hydraulically locked.

Rightward movement of the valve plunger 53 causes groove 101 to interconnect conduits 21a and 99 and, therefore, during reverse operation, override motors 97, 98 and 97a, 98a control the vent valve 68, and thus limit the horsepower demanded by the transmission, in the same manner as during forward operation. However, in the case of reverse operation, it is the second vent path leading from working chamber 29 that is opened and closed by land 92 to permit and prevent movement of cam plate 16 under the action of the biasing forces acting on it, and the first vent path leading from working chamber 28 that maintains the expanding side of motor 26 liquid-filled.

When the operator releases foot pedal 63a, springs 67 and 67a return valve plunger 53 to the neutral position thereby opening a supply path from charge pump 22 to working chamber 28 and an exhaust path from working chamber 29 to reservoir 45. Motor 26 now returns the cam plate 16 to the neutral position and this movement is accompanied by a following movement of valve sleeve 39 to the left and a following movement of valve sleeve 76 to the right. The vehicle comes to rest when the parts are returned to their illustrated positions.

As stated previously, the drawing and description relate only to the preferred embodiment of the invention. Since many changes can be made in the structure of this embodiment without departing from the inventive concept, the following claims should provide the sole measure of the scope of the invention.

What is claimed is:

1. A hydrostatic transmission comprising
   (a) a motor;
   (b) a variable displacement pump;
   (c) first and second conduits connecting the pump and motor in a transmission circuit;
   (d) a displacement control element connected with the pump and having a maximum displacement position in which the pump discharges to the first conduit and a minimum displacement position;
   (e) a manual actuator;
   (f) a reservoir;
   (g) a source of fluid under pressure;
   (h) a fluid pressure position-responsive servo control connected with the manual actuator and the displacement control element for positioning the latter in accordance with the position of the former, the servo control being connected with and deriving motive fluid from the source and including a fluid pressure motor connected with the displacement control element;
   (i) override means separate from the servo control for connecting the fluid pressure motor with the reservoir when the pressure in the first conduit exceeds a predetermined value; and
   (j) override control means responsive to the position of the displacement control element for increasing and decreasing said predetermined value as the displacement control element moves toward and away from the minimum displacement position.

2. A hydrostatic transmission comprising
   (a) a motor;
   (b) a variable displacement pump;
   (c) first and second conduits connecting the pump and motor in a transmission circuit;
   (d) a displacement control element connected with the pump and having a maximum displacement position in which the pump discharges to the first conduit and a minimum displacement position;
   (e) means biasing the displacement control element toward the minimum displacement position;
   (f) a fluid pressure motor connected with the displacement control element for moving it toward the maximum displacement position;
   (g) a reservoir;
   (h) a source of fluid under pressure;
   (i) a servo valve connected with the source, the reservoir and the fluid pressure motor and including a movable valve member and a coacting movable valve element, relative movement of the valve member and valve element establishing first and second positions in which the fluid pressure motor is connected with the source and the reservoir, respectively, and an intermediate null position in which that motor is isolated from both the source and the reservoir;
   (j) manual actuating means connected with the valve member for shifting it;
   (k) follow-up means interconnecting the valve element and the displacement control element so that movement of the displacement control element causes the valve element to move toward a null position with respect to the valve member;
   (l) override means separate from the servo valve for connecting the fluid pressure motor with the reservoir when the pressure in the first conduit exceeds a predetermined value; and
   (m) override control means responsive to the position of the displacement control element for increasing and decreasing said predetermined value as the displacement control element moves toward and away from the minimum displacement position.

3. A hydrostatic transmission as defined in claim 2
   (a) in which the override means comprises
      (1) a vent valve connected with the fluid pressure motor and the reservoir and including a valve member shiftable between first and second positions in which, respectively, the motor and reservoir are disconnected and connected,
      (2) a graduating spring biasing the valve member of the vent valve toward the first position,
      (3) a second fluid pressure motor connected with the valve member of the vent valve for shifting it toward the second position, and
      (4) means connecting the second fluid pressure motor with the first conduit; and
   (b) in which the override control means comprises
      (1) regulating means for varying the distance the valve member of the vent valve moves in shifting from the first to the second position, and
      (2) second follow-up means connecting the regulating means with the displacement control element, whereby said distance is increased and decreased, respectively, as the displacement control element moves toward and away from the minimum displacement position.

4. A hydrostatic transmission as defined in claim 3
   (a) in which the regulating means comprises a movable valve element that coacts with the valve member of the vent valve to establish the first and second positions; and
   (b) in which the second follow-up means shifts the valve element of the vent valve toward the second position relative to the valve member of the vent valve as the displacement control element moves toward the maximum displacement position and shifts the valve element of the vent valve toward the first position relative to the valve member of the vent valve as the displacement control element moves toward the minimum displacement position.

5. A hydrostatic transmission comprising
   (a) a reversible motor;
   (b) a variable displacement pump having a displacement control element movable between first and second maximum displacement positions on opposite sides of a neutral or zero displacement position to vary the displacement of and to change the direction of flow through the pump;
   (c) first and second conduits connecting the pump and motor in a transmission circuit, the first conduit receiving the fluid discharged by the pump when the displacement control element is on the same side of the neutral position as the first maximum displacement position and the second conduit receiving the fluid discharged by the pump when the displacement control element is on the opposite side of neutral position;
   (d) means biasing the displacement control element toward the neutral position;
   (e) first and second opposed fluid pressure motors connected with the displacement control element for moving it toward the first and second maximum displacement positions, respectively;
   (f) a reservoir;
   (g) a source of fluid pressure;
   (h) a servo valve connected with the source, the reservoir and the first and second motors and including a movable valve member and a coacting movable valve element, relative movement of the valve member and valve element establishing a first position in which the first and second motors are connected with the source and reservoir, respectively, a second position in which the first and second motors are connected with the reservoir and source, respectively, and an intermediate null position in which the motors are isolated from each other and from the source and the reservoir, the valve member and valve element having a neutral position which is a null position and from which the valve member is movable in first and second directions to cause the displacement control element to move toward said first and second maximum displacement positions, respectively;
(i) manually operated actuating means connected with the valve member for moving it in said first and second directions;
(j) follow-up means interconnecting the valve element and the displacement control element for causing the displacement control element to move the valve element to a null position with respect to the valve member;
(k) override means for connecting the first motor with the reservoir when the pressure in the first conduit exceeds a first predetermined value and for connecting the second motor with the reservoir when the pressure in the second conduit exceeds a second predetermined value; and
(l) override control means responsive to the position of the displacement control element for increasing and decreasing said predetermined values, respectively, as the displacement control element moves toward and away from the neutral position.

6. A hydrostatic transmission as defined in claim 5
(a) in which the override means comprises
  (1) a vent valve connected with the first and second fluid pressure motors and the reservoir and including a valve member shiftable between first and second positions in which, respectively, the motors and the reservoir are disconnected and connected,
  (2) a graduating spring biasing the valve member of the vent valve toward the first position,
  (3) a third fluid pressure motor connected with the valve member of the vent valve for shifting it toward the second position, and
  (4) selecting means for connecting the third fluid pressure motor with whichever of the first and second conduits is the higher pressure conduit; and
(b) in which the override control means comprises
  (1) regulating means for varying the distance the valve member of the vent valve must move in shifting from the first to the second position, and
  (2) second follow-up means connecting the regulating means with the displacement control element, whereby said distance is increased and decreased, respectively, as the displacement control element moves toward and away from the zero displacement position.

7. A hydrostatic transmission as defined in claim 6
(a) in which the regulating means comprises a movable valve element that coacts with the valve member of the vent valve to establish the first and second positions; and
(b) in which the second follow-up means shifts the valve element of the vent valve toward the second position relative to the valve member of the vent valve as the displacement control element moves away from the neutral position and shifts the valve element of the vent valve toward the first position relative to the valve member of the vent valve as the displacement control element moves toward the neutral position.

8. A hydrostatic transmission as defined in claim 6 in which the selecting means comprises a selector valve connected with the first and second conduits and the third fluid pressure motor and operated in unison with the valve member of the servo valve, the selector valve connecting the first conduit with the third fluid pressure motor when said valve member is moved in the first direction from neutral position and connecting the second conduit with the third fluid pressure motor when said valve member is moved in the second direction from neutral position.

References Cited in the file of this patent
UNITED STATES PATENTS

| 3,003,309 | Bowers et al. | Oct. 10, 1961 |
| 3,017,750 | Kempson | Jan. 23, 1962 |